(12) United States Patent
Kirschner (10) Patent No.: US 12,540,737 B2
(45) Date of Patent: Feb. 3, 2026

(54) SYSTEM FOR PRODUCING HEAT FOR DOMESTIC HOT WATER OR CENTRAL HEATING

(71) Applicants: DAIKIN INDUSTRIES, LTD., Osaka (JP); DAIKIN EUROPE N.V., Ostend (BE)

(72) Inventor: Timo Kirschner, Güglingen (DE)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 355 days.

(21) Appl. No.: 18/276,601

(22) PCT Filed: Feb. 4, 2022

(86) PCT No.: PCT/JP2022/004409
§ 371 (c)(1),
(2) Date: Aug. 9, 2023

(87) PCT Pub. No.: WO2022/172865
PCT Pub. Date: Aug. 18, 2022

(65) Prior Publication Data
US 2024/0125484 A1 Apr. 18, 2024

(30) Foreign Application Priority Data
Feb. 10, 2021 (EP) ..................... 21156209

(51) Int. Cl.
*F24D 3/08* (2006.01)
*F24H 1/18* (2022.01)
(Continued)

(52) U.S. Cl.
CPC .............. *F24D 3/08* (2013.01); *F24H 1/185* (2013.01); *F24H 1/52* (2013.01)

(58) Field of Classification Search
CPC ... F24D 3/00; F24D 3/02; F24D 3/082; F24D 10/00; F24D 11/002; F24D 11/004;
(Continued)

(56) References Cited

FOREIGN PATENT DOCUMENTS

CN 104235930 B * 5/2017
EP 2 629 020 A2 8/2013
(Continued)

OTHER PUBLICATIONS

European Search Report, issued in EP Application No. 21156209.5, dated Jul. 23, 2021.
(Continued)

*Primary Examiner* — Gregory A Wilson
(74) *Attorney, Agent, or Firm* — Birch, Stewart, Kolasch & Birch, LLP (57) ABSTRACT

A system includes: a heat generator obtaining heat from a heat source and having a generator outlet port and a generator return port; a central heating circuit having a heating feed port and a heating return port; a tank having a top portion and a bottom portion, the tank containing a heat storing medium; a first tapping coil immersed in the heat storing medium in the bottom portion of the tank; and a second tapping coil immersed in the heat storing medium in the top portion of the tank The heat generator, second tapping coil, central heating circuit, and first tapping coil are fluidly connected in series to allow fluid to flow from the heat generator via at least one of the second tapping coil, the central heating circuit, and the first tapping coil back to the heat generator The system includes first, second and third three-way valves.

20 Claims, 4 Drawing Sheets

(51) Int. Cl.
  *F24H 1/48*   (2022.01)
  *F24H 1/52*   (2022.01)
(58) Field of Classification Search
  CPC ............. F24D 17/0031; F24D 17/0026; F24D 17/0089; F24H 1/52; F24H 1/48; F24H 1/50
  See application file for complete search history.

(56) References Cited

FOREIGN PATENT DOCUMENTS

| | | | | |
|---|---|---|---|---|
| JP | 2004-294019 A | | 10/2004 | |
| NL | 8502349 A | * | 3/1987 | ............... F24D 3/08 |
| SK | 500612019 U1 | * | 1/2020 | ............ F24D 19/10 |
| WO | WO2010/041653 A1 | | 4/2010 | |
| WO | WO-2016042312 A1 | * | 3/2016 | ............... F24H 1/48 |

OTHER PUBLICATIONS

International Search Report for PCT/JP2022/004409 mailed on Apr. 20, 2022.
Written Opinion of the International Searching Authority for PCT/JP2022/004409 mailed on Apr. 20, 2022.
English translation of International Preliminary Report on Patentability and Written Opinion of the International Searching Authority for International Application No. PCT/JP2022/004409, dated Aug. 24, 2023.

* cited by examiner

SYSTEM FOR PRODUCING HEAT FOR DOMESTIC HOT WATER OR CENTRAL HEATING

TECHNICAL FIELD

The present invention relates to a system for producing domestic hot water and heat for central heating which comprises a heat generator for obtaining heat from a heat source, a central heating circuit, a tank having a top portion and a bottom portion, the tank containing a heat storing medium, a tapping coil immersed in the heat storing medium, and means to warm up domestic hot water.

BACKGROUND ART

Heating systems of the above technical field are generally known from the prior art, for example from EP 2 629 020 A2. According to this prior art device, a system for heating a building has a tank containing a heat storing medium. Usually, and also for the present invention, water is used as the heat storing medium. However, also other materials, in particular fluids, can be used.

The heat storing medium in the tank, such as water, tends to adopt a layered structure based on layers of different temperatures. Accordingly, the temperature of the heat storing medium within the tank changes more or less continuously from a relatively low temperature at the bottom of the tank to a relatively high temperature at its top. This layered structure is referred to as stratification and allows the heat storing medium to have not only a single average temperature at a time, but a relatively broad temperature range.

In the prior art device of the above-mentioned document, the heat storing medium is heated up via a heat exchanger. However, the heat exchanger is immersed in the heat storing medium in a vertical orientation and extends over a substantial distance from the top of the tank towards its bottom. Accordingly, the stratification inside the tank is destroyed by relatively hot fluid flowing through the coil of the heat exchanger from the top of the tank towards its bottom, thereby heating up not only the top portion, but also lower portions of the heat storing medium in the tank. In this way, heat is effectively transported to the bottom of the tank resulting in internal heating loss.

Further, the heat exchanger in this configuration cannot be optimally used under the above-mentioned circumstances. The active heat exchanging surface of the heat exchanger is reduced, if water in different stratification levels has the same or a higher temperature than the flow temperature within the heat exchanger. In other words, the heat exchanger is effectively inactive over a part of its length, namely, where the surrounding heat storing medium has the same or an even higher temperature than the flow temperature within the heat exchanger. Therefore, a decrease in efficiency of transferring heat to the heat storing medium in the tank can be observed, if the heat storing medium is heated up not according to the stratification of the heat storing medium.

A general trend currently is related to measures of reducing energy consumption of houses. Particularly during spring or autumn, the demand of houses for heat through a central heating is very limited, but not zero. This results in the heating system operating in an on-off cycle over a significant period of the year, which is inefficient. Especially switching between the "on"-state and the "off"-state of the system reduces the effectiveness of a heat generator or a general heat source.

Further, the above-mentioned device cannot make use of the heat energy of the coldest possible return fluid of a heating circuit. The lowest possible temperature of the return fluid would usually be below the temperature of the heat storing medium in the top portion of the tank so that the return fluid would cool down the top portion of the heat storing medium. Hence, even if the return fluid might still be warmer than the heat storing medium in the bottom portion of the tank, a mode of operation to transfer heat energy from the return fluid to the heat storing medium is not used at all.

A further disadvantage of the above-mentioned device is a relatively inefficient defrost operation in which heat storing medium of a relatively high temperature, i.e., hot water, is used for any defrost operation. This, in turn, means a reduction of the volume of heat storing medium for hot drinking water applications like domestic hot water (DHW) because these applications usually need the highest temperature of the heat storing medium, which usually is not the case for a heating circuit.

Accordingly, the known concept leaves room for improvement, even if the known concept is already a relatively efficient and environmentally friendly configuration of a heating system.

JP 2004-294019 A discloses an electric water heating apparatus which allows for preheating water in a hot water storing tank by sharing parts of a pump and a pipeline with a heat exchanger for heating. A lower part in the tank is provided with a heat exchanger for heat recovery to introduce water in a bathtub and perform heat exchange. Introduction pipes of a first heat exchanger for heating and a second heat exchanger for heat recovery are respectively connected to a lead-out pipe of the bathtub. Lead-out pipes of the heat exchanger for heating and the heat exchanger for heat recovery are respectively connected to an introduction pipe of the bathtub, and a selector valve is provided to selectively switch a passage of the lead-out pipe of the bathtub between the heat exchanger for heating and the heat exchanger for heat recovery. However, also this configuration suffers the disadvantages mentioned above with respect to EP 2 629 020 A.

SUMMARY OF INVENTION

Following the above, the present invention aims at solving the problem of how to increase the efficiency of known systems for producing domestic hot water and heat for a central heating, particularly in combination with a heat generator.

This problem is solved by a system for producing domestic hot water and heat for central heating according to claim 1. Preferred features and embodiments of the invention are subject to the dependent claims.

According to the present invention, a system is provided which comprises a heat generator for obtaining heat from a heat source, the heat generator having a generator outlet port and a generator return port, a central heating circuit having a heating feed port and a heating return port, a tank having a top portion and a bottom portion, the tank containing a heat storing medium, a first tapping coil immersed in the heat storing medium in the bottom portion of the tank, a second tapping coil immersed in the heat storing medium in the top portion of the tank, and means to warm up domestic hot water. According to the invention, the heat generator, the second tapping coil, the central heating circuit, and the first tapping coil are fluidly connected in series so as to allow fluid to flow from the heat generator via at least one of the second tapping coil, the central heating circuit, and the first tapping coil back to the heat generator. The system further comprises a first three-way valve fluidly connected to the generator outlet port, the second tapping coil, and the heating feed port and configured to selectively let the fluid bypass, or flow through, the second tapping coil, a second three-way valve fluidly connected to the heating feed port and the heating return port and configured to selectively let the fluid bypass, or flow through, the central heating circuit, and a third three-way valve fluidly connected to the first tapping coil and the generator return port and configured to selectively let the fluid bypass, or flow through, the first tapping coil.

By means of the present invention, it is possible to improve the efficiency of the heating process. Particularly, preheating of domestic hot water and also buffering of heat of fluid having a relatively low temperature in the tank is possible, thereby avoiding cycling effects which are detrimental for the efficiency of the heating. By the claimed configuration of the system, it is possible to selectively buffer heat energy provided by the heat generator partially or completely, or to use the heat energy in the central heating circuit. Preheating the fluid to be heated by the heat generator is possible via the heat storing fluid in the tank in order to increase the temperature of the fluid in addition to any heating function of the heat generator. For example, it is not only possible to store superfluous heat in the heat storing medium, but it is also possible to draw heat energy from the heat storing medium through at least one of the first and second tapping coils. In addition, heat of return fluid from a central heating, or of fluid bypassing the central heating circuit can be used for heating up the heat storing medium to thereby heat up domestic hot water in a more efficient way.

The stratification inside the tank can be preserved when heating up the heat storing medium according to the present configuration because it is possible to selectively use the first tapping coil or the second tapping coil and hence the temperature range of the heat storing medium surrounding the respective tapping coil. In this way, even heat energy of relatively cold fluid such as returning fluid can be transferred to, and therefore buffered in, the heat storing medium.

Because of the different vertical positions of the first and second tapping coils within the tank, i.e., in the top portion of the tank and in the bottom portion of the tank, respectively, it is possible to more specifically set heat transfer between the heating fluid, on the one hand, and the heat storing medium, on the other hand. In this way, an optimized temperature difference between the heating fluid and the heat storing medium for the heat transfer can be used. For transferring heat to the heat storing medium, colder fluid is guided through the first tapping coil in the bottom portion, whereas warmer fluid is guided through the second tapping coil in the top portion of the tank.

In this way, it is possible to selectively heat up only the top portion or only the bottom portion of the tank, or both portions to avoid internal losses due to a destroyed stratification, and hence a mixing of heat storing medium and to ensure an maximum effective heat exchange surface between the heat storing medium and the fluid. Accordingly, also cold fluids having a temperature which might only be above the temperature of the heat storing medium in the bottom portion of the tank, but not above the heat storing medium in the top portion of the tank, can be used for preheating the heat storing medium in the lower portion of the tank.

An extensive use of on-off-cycles can be avoided even during spring or autumn because the heat storing medium can be used as a buffer for heat energy of not only fluid of high temperature, but also of low temperature. This effect increases the efficiency of the system over prior art systems because of a more efficient usability of a heat generator which can be operated under full load for a longer period of time resulting in fewer switching operations between "on"-state and "off"-state. It is also possible to run a defrost operation at higher efficiency. For defrosting, it is not necessary to use high temperature fluid, but as long as the temperature of the fluid is sufficiently above the freezing level to not freeze in the central heating circuit, the defrost operation can be carried out effectively. Since defrosting is not meant to heat up the central heating circuit, but to exclude freezing of the central heating circuit, the required temperature of the fluid is much lower than for the heating operation. The present invention allows for more efficient defrosting by using a relatively low temperature level for the defrosting fluid in order not to waste heat energy of high temperature heat storing medium in the top portion of the tank, for example. Rather, a temperature level corresponding to the temperature around the first tapping coil immersed in the heat storing medium in the bottom portion of the tank is already sufficient for the defrosting, so that it is not necessary to use heat energy at the higher temperature level at the top of the tank.

Due to the claimed configuration of the system for producing domestic hot water and heat for central heating, it is possible to more efficiently make use of the heat generated by the heat generator, and to reduce the number of switching operations between an "on"-state and an "off"-state of the heat generator.

A further advantage of the invention is a function of free cooling. When the heat storing medium in the bottom portion of the tank is cooled down due to tapping, it can be used, for example during the summer when the environment is relatively warm, to provide cold flow water to the house for which the heating is installed. Providing the cold flow water to the house under these circumstances results in a warm return flow from the house, which subsequently heats up the heat storing medium in the bottom portion of the tank. This effect can also be used for heat generators which normally have no cooling function.

According to a preferred embodiment, the first three-way valve is configured to selectively let the fluid partially bypass and partially flow through the second tapping coil.

In this way, further flexibility is achieved in that it is not only possible to let the fluid completely bypass or flow through the second tapping coil, but also partially. This allows a finer adjustment of the amount of heat energy to be buffered in, or taken from, the heat storing medium. However, it is also possible to configure the first three-way valve so as to only let the fluid completely bypass or flow through the second tapping coil.

According to a preferred embodiment, the second tapping coil has a second coil feed port and a second coil return port, wherein the first three-way valve is fluidly connected to the second coil feed port and the generator outlet port and configured to selectively block the second coil feed port at least partially so as to let the fluid bypass the second tapping coil at least partially.

This configuration is a particularly efficient way of guiding the fluid from the heat generator around, or through, the second tapping coil, depending on the demand for heat energy in respective parts of the system. As an alternative, the first three-way valve can also be fluidly connected to the second coil return port instead of the second coil feed port. By blocking the second coil return port, the second tapping coil can also be bypassed, but placing the first three-way valve upstream of the coil, i.e., at its feed port is advantageous.

In a preferred embodiment, the second three-way valve is configured to selectively let the fluid partially bypass and partially flow through the central heating circuit.

In this way, further flexibility is achieved in that it is not only possible to let the fluid completely bypass or flow through the central heating circuit, but also partially. This allows a finer adjustment of the amount of heat energy to be used in the central heating circuit. However, it is also possible to configure the second three-way valve so as to only let the fluid completely bypass or flow through the central heating circuit.

Preferably, the third three-way valve is configured to selectively let the fluid partially bypass and partially flow through the first tapping coil.

In this way, further flexibility is achieved in that it is not only possible to let the fluid completely bypass or flow through the first tapping coil, but also partially. This allows a finer adjustment of the amount of heat energy to be buffered in, or taken from, the heat storing medium. However, it is also possible to configure the third three-way valve so as to only let the fluid completely bypass or flow through the first tapping coil.

According to a preferred embodiment, the first tapping coil has a first coil feed port and a first coil return port, wherein the third three-way valve is fluidly connected to the first coil feed port and the generator return port and configured to selectively block the first coil feed port at least partially so as to let the fluid bypass the first tapping coil at least partially.

In this way, similar to the above description of the preferred configuration of the first three-way valve, this configuration is a particularly efficient way of guiding the fluid from the central heating circuit, or its bypass, around, or through, the first tapping coil, depending on the demand for heat energy in respective parts of the system. As an alternative, the third three-way valve can also be fluidly connected to the first coil return port instead of the first coil feed port. By blocking the first coil return port, the first tapping coil can also be bypassed, but placing the third three-way valve upstream of the coil, i.e., at its feed port is advantageous.

A preferred system further comprises a pump which is configured to drive the fluid to flow from the heat generator back to the heat generator, preferably via at least one of the second tapping coil, the central heating circuit, and the first tapping coil, depending on the settings of the first to third three-way valves of the system.

Such a pump facilitates the operation of the system but is not entirely necessary for that operation. However, using a pump allows for more precisely adjusting the flow speed of the fluid through the system and thereby more precisely controlling the amount of heat being transferred. In addition or as an alternative to this pump, it is also possible to provide one or more pump or pumps for selectively driving the flow of the fluid through the first or second tapping coils or the central heating circuit.

A preferred system comprises an electrical heater for heating the fluid, wherein the electrical heater is configured for directly heating the fluid downstream of the heat generator outlet port, and preferably upstream of the first three-way valve.

Such an electrical heater allows for supplementing the heat energy being fed into the system by the heat generator, particularly if the heat generator does not generate enough heat for the central heating circuit or domestic hot water or other applications of heat, for example because the heat source does not provide enough heat energy. This can, for example, be the case, if the outside temperature is very low so that the demand of heat energy is relatively high, whereas, at the same time, the amount of heat being generated by the heat generator could be comparably low.

The preferred position of the electrical heater results in a particularly efficient usability of the heat energy fed into the system by the electrical heater. Thereby, the valves and elements of the system can be used more or less in the same way as during operation of only the heat generator, but not the electrical heater. In this way, the electrical heater can provide additional heat at a temperature level above the level provided by the heat generator to thereby heat up the fluid from the heat generator up to the temperature necessary or desired for the system downstream of the electrical heater. In the preferred location of the electrical heater, this cannot only be feeding the central heating circuit with hot fluid, but also the second tapping coil for heating up the heat storing medium within the tank, e.g., in order to provide heat for domestic hot water applications.

According to a preferred embodiment, the system comprises an electrical immersed heater immersed in the heat storing medium in the tank for heating the heat storing medium.

Similar to the above configuration of the system having an electrical heater for directly heating the fluid downstream of the heat generator outlet port, an electrical heater can also be used to indirectly heat up the fluid by means of directly heating up the heat storing medium within the tank. Heating up the heat storing medium within the tank can have the additional effect of directly heating drinking water, namely, if the heat storing medium is tapping water and not only a medium which is used for storing heat. Further, it is possible to combine an electrical heater for directly heating fluid downstream of the heat generator, in particular the fluid to be led through the central heating circuit, as well as an electrical immersed heater for heating up the heat storing medium within the tank.

According to a preferred embodiment, the generator outlet port is fluidly connected, via the first three-way valve, to the second tapping coil and, optionally via the second three-way valve, to the heating feed port. The second tapping coil can be fluidly connected, optionally via at least one of the first three-way valve and the second three-way valve, to the heating feed port. The heating return port can be fluidly connected, optionally via at least one of the second three-way valve and the third three-way valve, to the first tapping coil. The first tapping coil can be fluidly connected, optionally via the third three-way valve, to the generator return port.

In a preferred configuration, the first three-way valve is located to let the fluid flow through, or bypass, the second tapping coil. Hence, the first three-way valve can be used to decide whether the fluid leaving the heat generator is to be used for heating up the heat storing medium in the tank via the second tapping coil or directly for the central heating, preferably also partially.

When at least a portion of the fluid bypasses the second tapping coil through the first three-way valve, it can be directly led to the central heating, or pass, on its way to the central heating, the second three-way valve. The second three-way valve can be located along the way directly from the first three-way valve and/or the second coil return port to the heating feed port to let the fluid at least partially flow through or bypass the central heating by at least partially opening, or cutting off, the line to the heating feed port, or it can be located along a bypass line bypassing the central heating, in which case the first three-way valve and/or the second coil return port can be directly connected to the heating feed port.

The second tapping coil, in particular the second coil return port, can be directly fluidly connected to the heating feed port, via the second three-way valve, as described before, and/or via the first three-way valve, if the first three-way valve is configured as an intersection of the generator outlet port and the second coil return port, or both.

The heating return port can be fluidly connected, directly or via the second three-way valve or the third three-way valve or both, to the first tapping coil. The location of the second and third three-way valves decides on whether the heating return port is fluidly connected via any of these three-way valves. However, irrespective of the location in accordance with the above, it is possible for the fluid to be led through the first tapping coil, or bypass the first tapping coil, depending on the temperature of the fluid returning from the central heating circuit, as well as the temperature of, and its distribution over, the heat storing medium within the tank.

The preferred embodiment is particularly efficient as to its operation for selectively storing heat energy within the heat storing medium in the tank and/or using heat energy of the heat storing medium for the central heating circuit or tapping water, particularly according to a preheating operation. Also, the buffering feature of the system according to the invention can be realised in a particularly efficient way according to this configuration. Further, a minimum number of parts is necessary to obtain a system having the described advantageous effects which is also a reason why this preferred embodiment is particularly efficient.

In a preferred embodiment, the tank is unpressurized and the system further comprises, as the means to warm up domestic hot water, a heat exchanger to transfer heat from the heat storing medium to the domestic hot water.

The heat exchanger to transfer heat from the heat storing medium to the domestic hot water can be located inside or outside of the tank and allows for separating the heat storing medium, on the one hand, and the domestic hot water, on the other hand.

Therefore, the heat storing medium can be chosen irrespective of any requirements to be met by drinking water so that ingredients or additives can be contained in the heat storing medium which could be unallowed in drinking water. Hence, a broader range of fluids can be used as heat storing medium, which can be particularly helpful in terms of maintenance or wear of the system.

Preferably, the heat exchanger comprises a heat exchanger coil immersed in the heat storing medium in the tank. In this way, the heat energy can be transferred between the heat storing medium and the fluid flowing through the heat exchanger in a well-controlled fashion and allows for making use of generally known devices. Further, as opposed to an external heat exchanger, there is only little additional space required for the heat exchanger, as long as the tank is sufficiently sized for containing the heat exchanger coil. Further, it is not required to actively drive the heat storing medium to the heat exchanger coil in order to exchange heat.

As an alternative, or in addition, to the above-mentioned embodiment, the heat exchanger preferably comprises a domestic hot water heat exchanger outside of the tank, the domestic hot water heat exchanger being fluidly connected to the tank so as to allow the heat storing medium to flow through the domestic hot water heat exchanger, and the system more preferably further comprises a heat exchanger pump configured to drive the heat storing medium to flow through the domestic hot water heat exchanger.

Providing an external heat exchanger outside of the tank allows for more flexibility in placing the heat exchanger within the building and minimising the size of the tank. Further, the dimensions of the heat exchanger, and therefore the heat exchanging capacity, is not so closely linked with the size of the tank which increases flexibility of the overall system. The optional heat exchanger pump allows for more precisely controlling the amount of heat storing medium flowing carrying heat energy through the heat exchanger, i.e., the amount of heat transferred to the domestic hot water within the heat exchanger.

According to an alternative embodiment, the tank is pressurized and comprises a domestic hot water inlet and a domestic hot water outlet, and the heat storing medium is the domestic hot water.

This configuration of the system minimises any losses in transferring heat energy from the heat storing medium to domestic hot water. Since the domestic hot water is, in this preferred embodiment, at the same time the heat storing medium, there is no heat transfer required between the heat storing medium and domestic hot water. Therefore, domestic hot water can more efficiently be heated up, if compared to a configuration in which a separate heat storing medium is used for ultimately heating up domestic hot water.

Further advantages of the invention can be derived from the whole set of claims as well as the following description of the figures and preferred embodiments.

DESCRIPTION OF EMBODIMENTS

Figure 1:
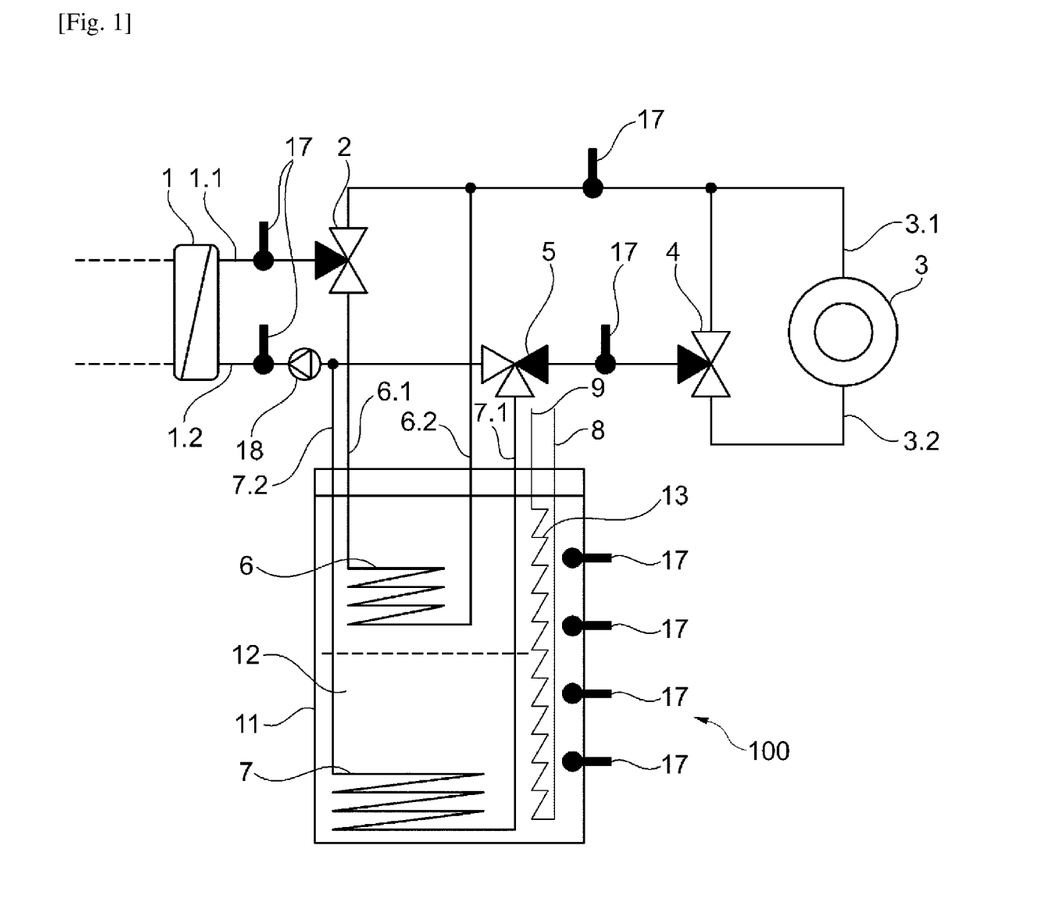
FIG. 1 illustrates a first embodiment of a preferred system for producing domestic hot water and heat for central heating.

FIG. 1 illustrates a first embodiment of the preferred system 100 for producing domestic hot water and heat for central heating. The system 100 comprises a heat generator 1, a central heating circuit 3 and a tank 11 holding a heat storing medium 12 into which a first tapping coil 7 and a second tapping coil 6 are immersed. Further, a heat exchanger coil 13 is immersed in the heat storing medium 12 in the tank 11.

The system 100 is configured so that the heat generator 1, the second tapping coil 6, the central heating circuit 3 and the first tapping coil 7 are fluidly connected in series and form a circuit in that the first tapping coil is fluidly connected to the heat generator 1.

The heat generator 1 comprises a generator outlet port 1.1 and a generator return port 1.2. The fluid heated up in the heat generator 1 leaves the heat generator 1 via the generator outlet port 1.1 and passes a first three-way valve 2 where it can partially or completely be led through the second tapping coil 6 via a second coil feed port 6.1, or bypass the second tapping coil 6 and flow directly towards the central heating circuit 3. If the fluid is led through the second tapping coil 6, it enters the second tapping coil 6 via the second coil feed port 6.1 to heat up the heat storing medium 12, which preferably is water, in the upper portion of the tank 11. Further, the fluid leaves the second tapping coil 6 via a second coil return port 6.2 to further flow towards the central heating circuit 3, optionally joining a portion of the fluid which was directly led, by the first three way valve 2, towards the central heating circuit 3, if any.

The central heating circuit 3 comprises a heating feed port 3.1 and a heating return port 3.2. The fluid can, via a second three-way valve 4, bypass or be led through the central heating circuit 3, completely or partially. For this purpose, the second three-way valve 4 is configured to open or block completely or partially a bypass line for bypassing the central heating circuit 3, as illustrated in FIG. 1.

Further downstream, FIG. 1 illustrates a third three-way valve 5 by which it can be controlled whether the fluid flows via a first coil feed port 7.1 through the first tapping coil 7 and leaving through a first coil return port 7.2. The first tapping coil 7 is located in the bottom portion of the tank 11, where heat storing medium 12 of a lower temperature, if compared to the top portion of the tank 11, is present in accordance with the stratification of the heat storing medium 12. From the third three-way valve 5 and/or the first coil return port 7.2, the fluid returns via the heat generator return port 1.2 back to the heat generator 1 to be potentially heated up again.

For the sake of clarity, it is noted that the first three-way valve 2 can be located not only at the second coil feed port 6.1, but also at the second coil return port 6.2, the second three-way valve 4 can be located not only at the heating return port 3.2, but also at the heating feed port 3.1, and the third three-way valve 5 can be located not only at the first coil feed port 7.1, but also at the first coil return port 7.2.

The tank 11 also encloses a heat exchanger coil 13 through which domestic hot water is heated up by the heat stored in the heat storage medium 12 within the tank 11. For this purpose, a drinking water cold inlet 8 is provided through which the cold drinking water is led into the tank 11, heated up by heat storing medium 12 within the tank 11, from the bottom portion towards the top portion, to leave the tank 11 via a drinking water hot outlet 9 provided in the top portion of the tank 11.

A pump 18 is used to drive the fluid through the heat generator 1, and selectively through or by the central heating circuit 3, the first tapping coil 7 and the second tapping coil 6. The pump 18 can be located anywhere along the lines which the fluid passes in every configuration of the three-way-valves.

In order to determine the temperatures of the respective fluids along the circuit and in the tank 11, a couple of thermometers 17 are provided along the lines, as can be seen in FIG. 1.

The preferred configuration of valves and other elements of the system 100 as illustrated in FIG. 1 allows for very efficiently heating up a house via a central heating circuit 3 to the required extent, but also using heat of the heat generator 1 for preheating the heat storing medium 12 as a buffer, which not only allows for using the generated heat energy in future heating operations, heating up domestic hot water or defrosting, but also allows for a more continuous operation of the heat generator and peripheral devices such as pumps, to thereby further increase the efficiency of these devices and, thus, the overall system.

Figure 2:
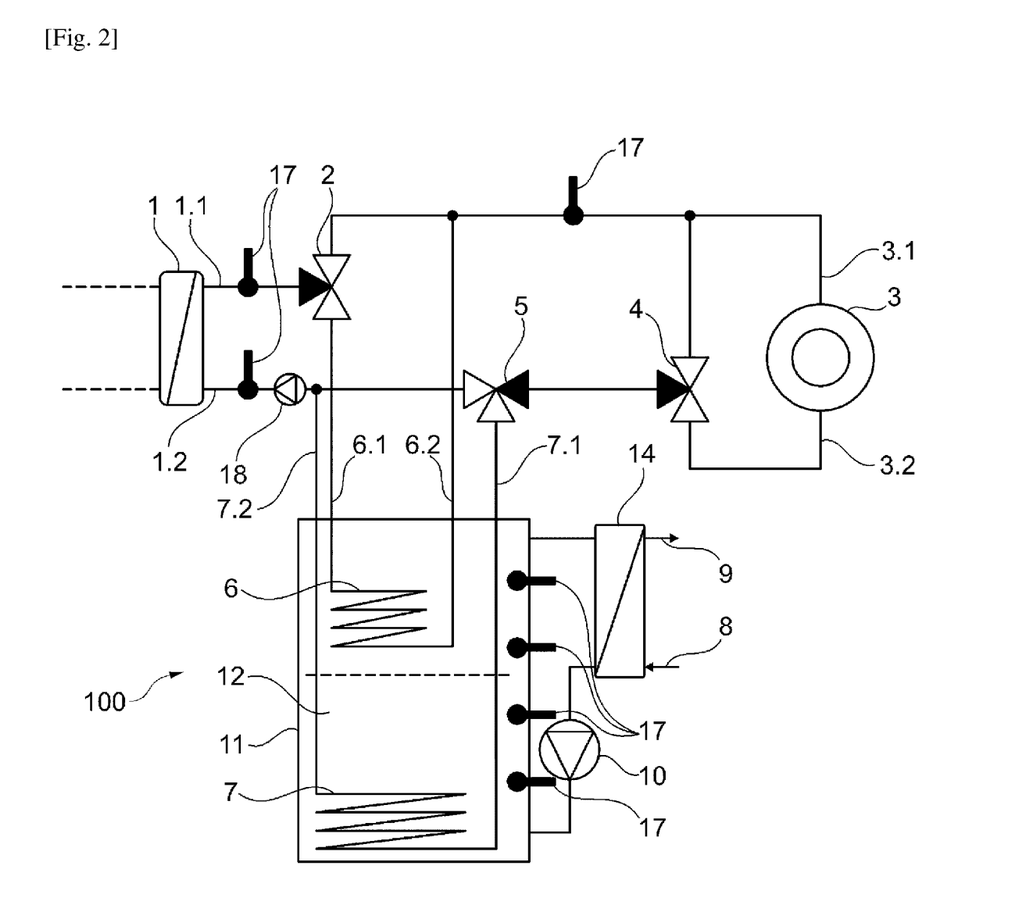
FIG. 2 illustrates a second embodiment of a preferred system for producing domestic hot water and heat for central heating.

FIG. 2 illustrates a second embodiment of the preferred system for producing domestic hot water and heat for central heating.

The same or similar elements as in FIG. 1 are provided with the same reference numbers and a repetitive description of these elements is avoided for the sake of brevity.

As an alternative to the embodiment illustrated in FIG. 1, domestic hot water is heated up in this second preferred embodiment by means of an external domestic hot water heat exchanger 14 instead of the heat exchanger coil 13 used in the first embodiment of FIG. 1. For this purpose, the heat storing medium 12 from the tank 11 is led through the external domestic hot water heat exchanger 14, driven by a heat exchanger pump 10, and the drinking water cold inlet 8 and drinking water hot outlet 9 are located at the external domestic hot water heat exchanger 14 so that the drinking water is heated up in the domestic hot water heat exchanger 14 outside of the tank 11. In this way, the domestic hot water, e.g., drinking water, can be heated up at a different location outside of the tank 11, and the tank 11 can be made smaller because the heat exchanger coil 13 illustrated in FIG. 1 is no longer required to be placed within the tank 11 in the second embodiment according to FIG. 2.

Figure 3:
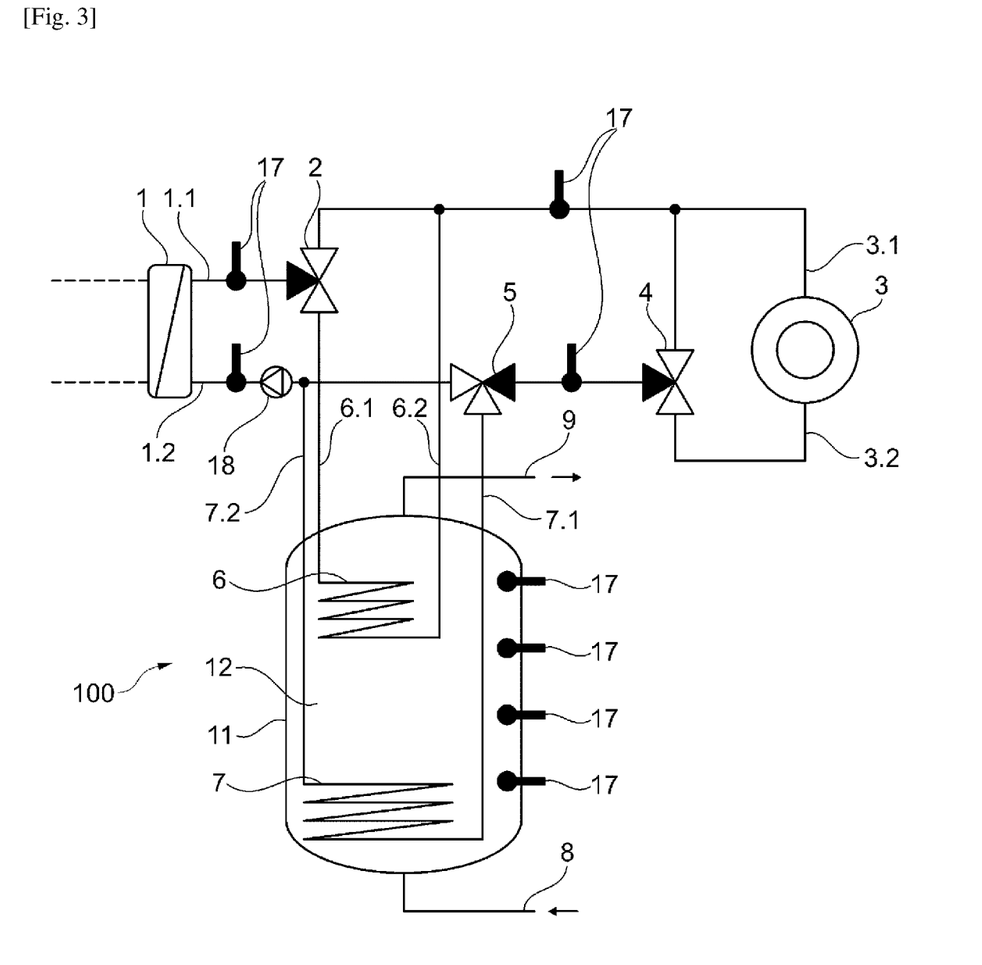
FIG. 3 illustrates a third embodiment of a preferred system for producing domestic hot water and heat for central heating.

FIG. 3 illustrates a third embodiment of a preferred system 100 for producing domestic hot water and heat for central heating. Again, as for FIG. 2, the same elements as illustrated in FIG. 1 or 2 described above carry the same reference numbers also in FIG. 3.

In contrast to the first and second embodiments, the tank 11 in the third embodiment is a pressurised tank 11, which means that the heat storing medium 12 stored within the tank 11 is under pressure, for example the pressure of a tapping water circuit. In this embodiment, the heat storing medium 12 is drinking water, and the means to warm up domestic hot water of the third embodiment are the drinking water cold inlet 8 and the drinking water hot outlet 9 through which the drinking water is led through the tank 11, to be heated up within the tank 11. In this way, the losses when transferring heat energy from the heat storing medium 12 to the drinking water or other domestic hot water, which exist in the first and second embodiments, even if they can made relatively small, are further minimised because of directly heating up the domestic hot water within the tank 11.

Figure 4:
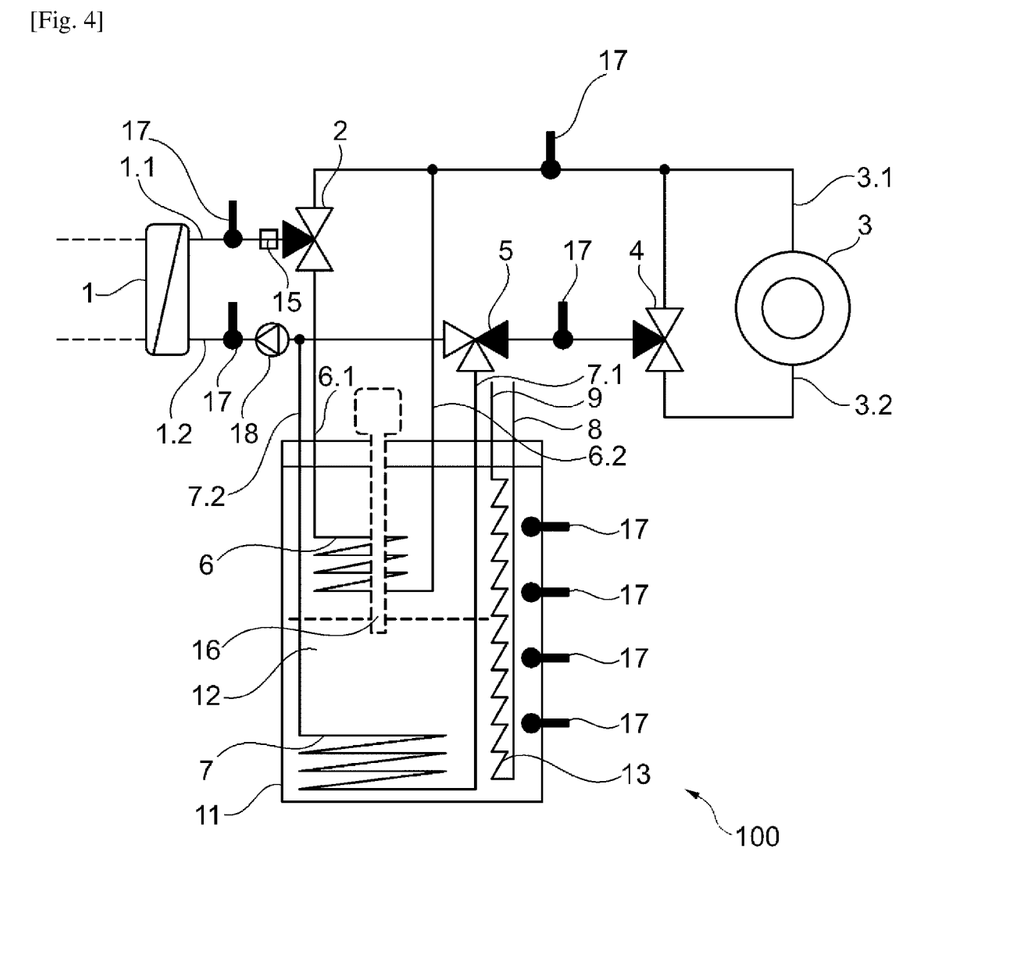
FIG. 4 illustrates a fourth embodiment of a preferred system for producing domestic hot water and heat for central heating.

FIG. 4 illustrates a fourth embodiment of a preferred system 100 for producing domestic hot water and heat for central heating.

This embodiment substantially corresponds to the first embodiment illustrated in FIG. 1 described above. In addition to the first embodiment, the system 100 according to the fourth embodiment comprises an electrical heater 15 between the heat generator 1 and the first three-way valve 2 to directly heat up the fluid within the circuit for circulating the electrically heated fluid towards the central heating circuit 3 and/or through the first or second tapping coils 6, 7 to thereby heat up the house and/or the heat storing medium 12 within the tank 11.

In addition or alternatively, an electrical immersed heater 16 is used to heat up the heat storing medium 12 to indirectly heat up domestic hot water via the heat exchanger coil 13, or the fluid flowing through the second tapping coil 6 or the first tapping coil 7. Both electrical heaters 15, 16 aim at additionally providing heat energy to the system 100, if the heat generator 1 does not provide enough heat energy for the system 100. This can, for example, be the case, if the outside temperature is particularly low, or in case of a very high demand of heat which cannot be served by the heat generator 1 alone.

REFERENCE SIGNS LIST 1 heat generator
1.1 generator outlet port
1.2 generator return port
2 first three-way valve
3 central heating circuit
3.1 heating feed port
3.2 heating return port
4 second three-way valve
5 third three-way valve
6 second tapping coil
6.1 second coil feed port
6.2 second coil return port
7 first tapping coil
7.1 first coil feed port
7.2 first coil return port
8 drinking water cold inlet
9 drinking water hot outlet
10 heat exchanger pump
11 tank
12 heat storing medium
13 heat exchanger coil
14 domestic hot water heat exchanger
15 electrical heater
16 electrical immersed heater
17 thermometer
18 pump
100 system

CITATION LIST

Patent Literature

[PTL 1] EP 2 629 020 A2
[PTL 2] JP 2004-294019 A

The invention claimed is:

1. A system for producing heat for domestic hot water or central heating comprising:
a heat generator for obtaining heat from a heat source, the heat generator having a generator outlet port and a generator return port;
a central heating circuit having a heating feed port and a heating return port;
a tank having a top portion and a bottom portion, the tank containing a heat storing medium;
a first tapping coil immersed in the heat storing medium in the bottom portion of the tank; and
a second tapping coil immersed in the heat storing medium in the top portion of the tank; and
wherein the heat generator, the second tapping coil, the central heating circuit, and the first tapping coil are fluidly connected in series so as to allow fluid to flow from the heat generator via at least one of the second tapping coil, the central heating circuit, and the first tapping coil back to the heat generator;
the system further comprising
a first three-way valve fluidly connected to the generator outlet port, the second tapping coil, and the heating feed port and configured to selectively let the fluid bypass, or flow through, the second tapping coil;
a second three-way valve fluidly connected to the heating feed port and the heating return port and configured to selectively let the fluid bypass, or flow through, the central heating circuit; and
a third three-way valve fluidly connected to the first tapping coil and the generator return port and configured to selectively let the fluid bypass, or flow through, the first tapping coil.

2. The system according to claim 1,
wherein the first three-way valve is configured to selectively let the fluid partially bypass and partially flow through the second tapping coil.

3. The system according to claim 2,
wherein the second tapping coil has a second coil feed port and a second coil return port,
wherein the first three-way valve is fluidly connected to the second coil feed port and the generator outlet port and configured to selectively block the second coil feed port at least partially so as to let the fluid bypass the second tapping coil at least partially.

4. The system according to claim 2,
wherein the second three-way valve is configured to selectively let the fluid partially bypass and partially flow through the central heating circuit.

5. The system according to claim 2,
wherein the third three-way valve is configured to selectively let the fluid partially bypass and partially flow through the first tapping coil.

6. The system according to claim 1,
wherein the second tapping coil has a second coil feed port and a second coil return port,
wherein the first three-way valve is fluidly connected to the second coil feed port and the generator outlet port and configured to selectively block the second coil feed port at least partially so as to let the fluid bypass the second tapping coil at least partially.

7. The system according to claim 6,
wherein the second three-way valve is configured to selectively let the fluid partially bypass and partially flow through the central heating circuit.

8. The system according to claim 6,
wherein the third three-way valve is configured to selectively let the fluid partially bypass and partially flow through the first tapping coil.

9. The system according to claim 1,
wherein the second three-way valve is configured to selectively let the fluid partially bypass and partially flow through the central heating circuit.

10. The system according to claim 9,
wherein the third three-way valve is configured to selectively let the fluid partially bypass and partially flow through the first tapping coil.

11. The system according to claim 1,
wherein the third three-way valve is configured to selectively let the fluid partially bypass and partially flow through the first tapping coil.

12. The system according to claim 1,
wherein the first tapping coil has a first coil feed port and a first coil return port,
wherein the third three-way valve is fluidly connected to the first coil feed port and the generator return port and configured to selectively block the first coil feed port at least partially so as to let the fluid bypass the first tapping coil at least partially.

13. The system according to claim 1,
further comprising a pump which is configured to drive the fluid to flow from the heat generator via at least one of the second tapping coil, the central heating circuit, and the first tapping coil back to the heat generator.

14. The system according to claim 1 further comprising an electrical heater for heating the fluid, wherein the electrical heater is configured for directly heating the fluid downstream of the heat generator outlet port, and upstream of the first three-way valve.

15. The system according to claim 1 further comprising an electrical immersed heater immersed in the heat storing medium in the tank for heating the heat storing medium.

16. The system according to claim 1,
wherein the generator outlet port is fluidly connected, via the first three-way valve, to the second tapping coil and, optionally via the second three-way valve, to the heating feed port,
wherein the second tapping coil is fluidly connected, optionally via at least one of the first three-way valve and the second three-way valve, to the heating feed port,
wherein the heating return port is fluidly connected, optionally via at least one of the second three-way valve and the third three-way valve, to the first tapping coil, and
wherein the first tapping coil is fluidly connected, optionally via the third three-way valve, to the generator return port.

17. The system according to claim 1,
wherein the tank is unpressurized,
the system further comprises a heat exchanger to transfer heat from the heat storing medium to domestic hot water so as to warm up the domestic hot water.

18. The system according to claim 17,
wherein the heat exchanger comprises a heat exchanger coil immersed in the heat storing medium in the tank.

19. The system according to claim 17,
wherein the heat exchanger comprises a domestic hot water heat exchanger outside of the tank, the domestic hot water heat exchanger being fluidly connected to the tank so as to allow the heat storing medium to flow through the domestic hot water heat exchanger,
and the system further comprises a heat exchanger pump configured to drive the heat storing medium to flow through the domestic hot water heat exchanger.

20. The system according to claim 1,
wherein the tank is pressurized,
wherein the tank comprises a domestic hot water inlet and a domestic hot water outlet to warm up domestic hot water, and
wherein the heat storing medium is the domestic hot water.

\* \* \* \* \*